US005771108A

United States Patent [19]

Ikeda et al.

[11] Patent Number: 5,771,108
[45] Date of Patent: Jun. 23, 1998

[54] COLOR IMAGE PROCESSING APPARATUS CAPABLE OF HANDLING IMAGES READ LOCALLY AND IMAGES RECEIVED FROM AN EXTERNAL APPARATUS

[75] Inventors: Yoshinori Ikeda, Kawasaki; Michio Kawase; Motoaki Tahara, both of Yokohama, all of Japan

[73] Assignee: Canon Kabushiki Kaisha, Tokyo, Japan

[21] Appl. No.: 384,690

[22] Filed: Feb. 6, 1995

Related U.S. Application Data

[63] Continuation of Ser. No. 691,968, Apr. 26, 1991, abandoned.

[30] Foreign Application Priority Data

Apr. 27, 1990 [JP] Japan ..................................... 2-111974

[51] Int. Cl.[6] .............................. H04N 1/46; H04N 1/387
[52] U.S. Cl. .......................... 358/500; 358/540; 358/450
[58] Field of Search ................................. 358/500, 518, 358/520, 530, 540, 401, 442, 443, 444, 448, 450, 452, 470

[56] References Cited

U.S. PATENT DOCUMENTS

| | | | |
|---|---|---|---|
| 4,893,179 | 1/1990 | Ito | 358/79 |
| 4,931,815 | 6/1990 | Sato et al. | 358/154 |
| 4,958,219 | 9/1990 | Kadowaki | 358/75 |
| 4,970,584 | 11/1990 | Sato et al. | 358/75 |
| 5,021,876 | 6/1991 | Kurita et al. | 358/75 |
| 5,032,928 | 7/1991 | Sakai et al. | 358/448 |
| 5,109,281 | 4/1992 | Kobori et al. | 358/450 |

FOREIGN PATENT DOCUMENTS

| | | |
|---|---|---|
| 3712587 | 10/1987 | Germany . |
| 2128843 | 5/1984 | United Kingdom . |
| 2190265 | 11/1987 | United Kingdom ............ H04N 1/46 |

*Primary Examiner*—Thomas D. Lee
*Attorney, Agent, or Firm*—Fitzpatrick, Cella, Harper & Scinto

[57] ABSTRACT

An image processing system stores image data which has been read, in order to supply the image data to a plurality of printer units, reads out the stored image data and time-sharingly supplies the data to the printer units, and supplies the read image data, and image data from an external section, to memory.

18 Claims, 14 Drawing Sheets

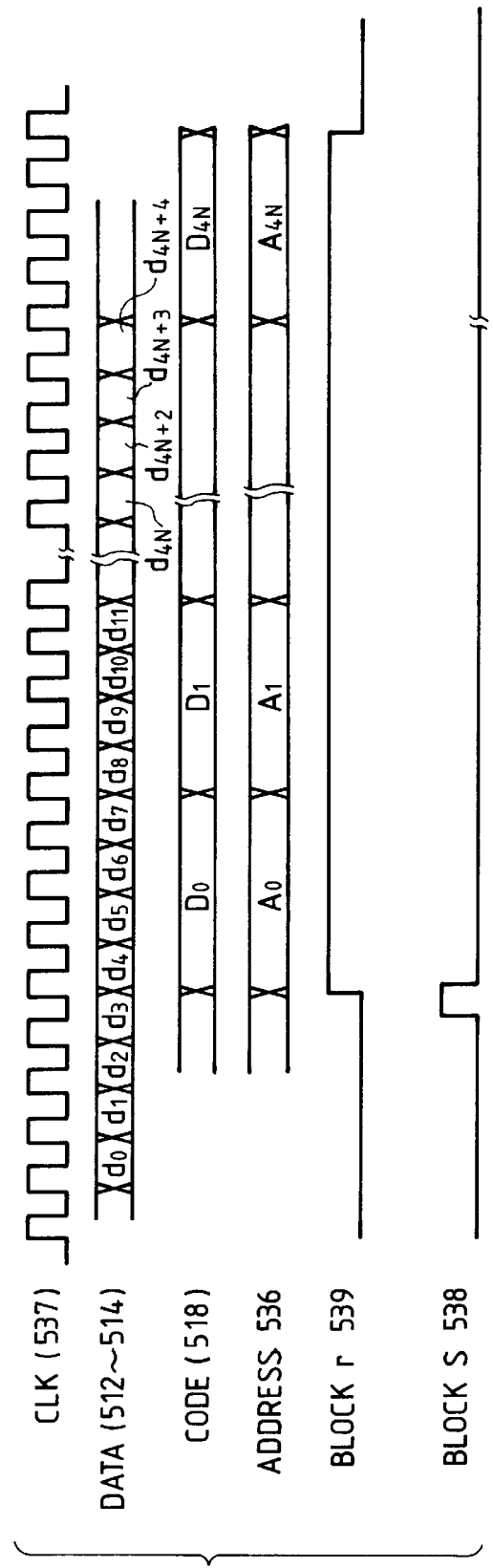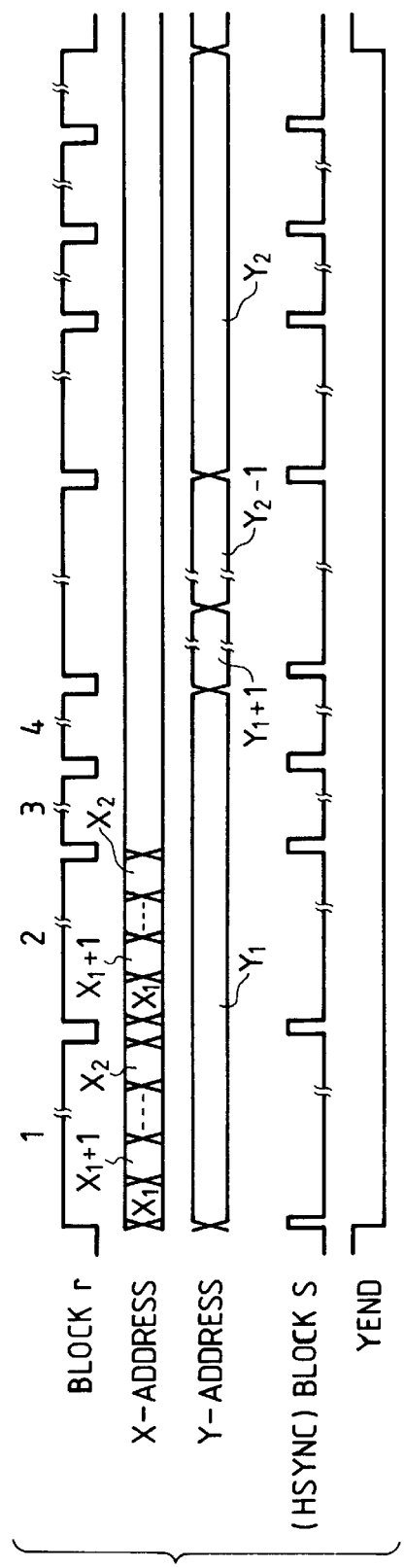
FIG. 11A
FIG. 11B

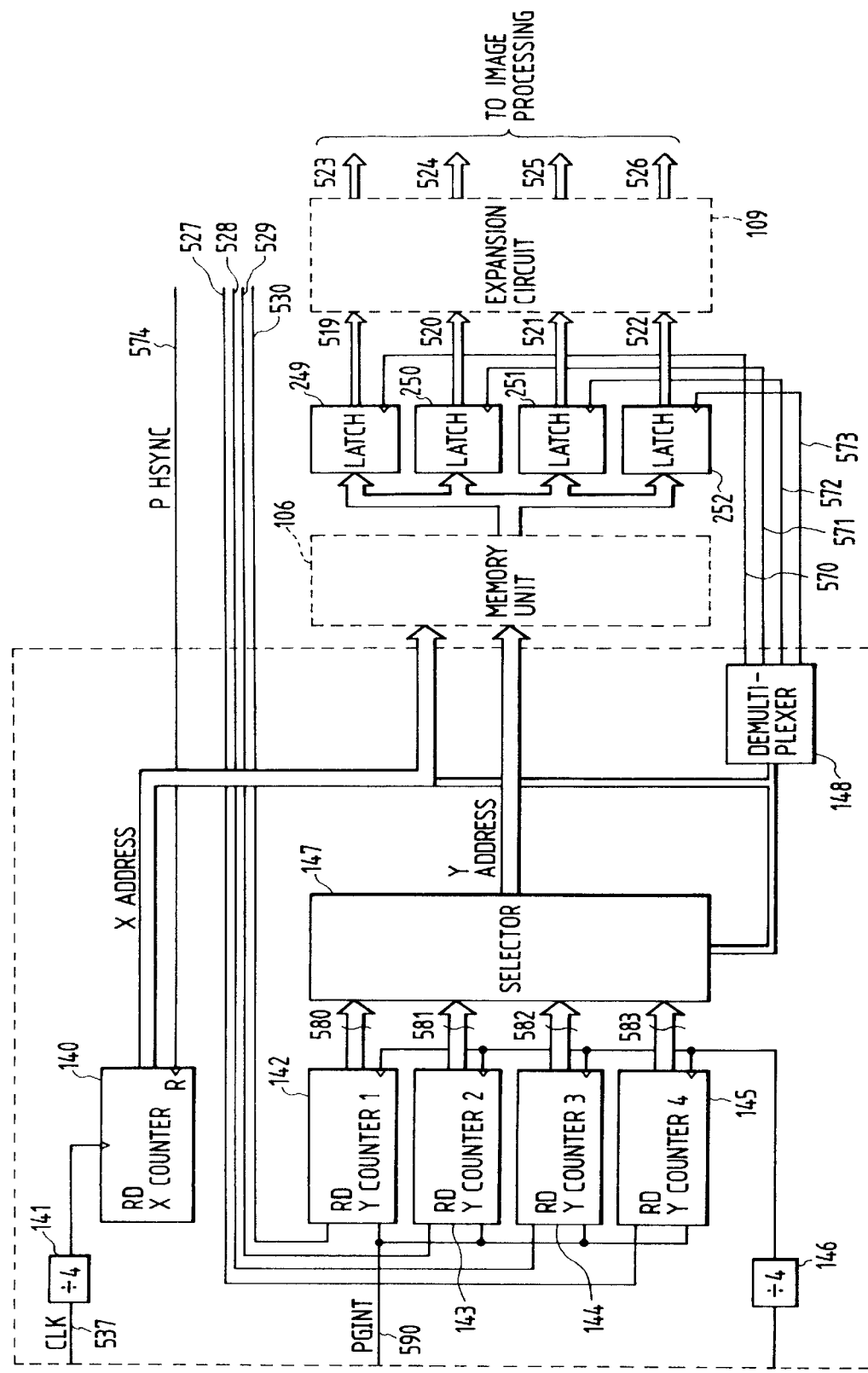

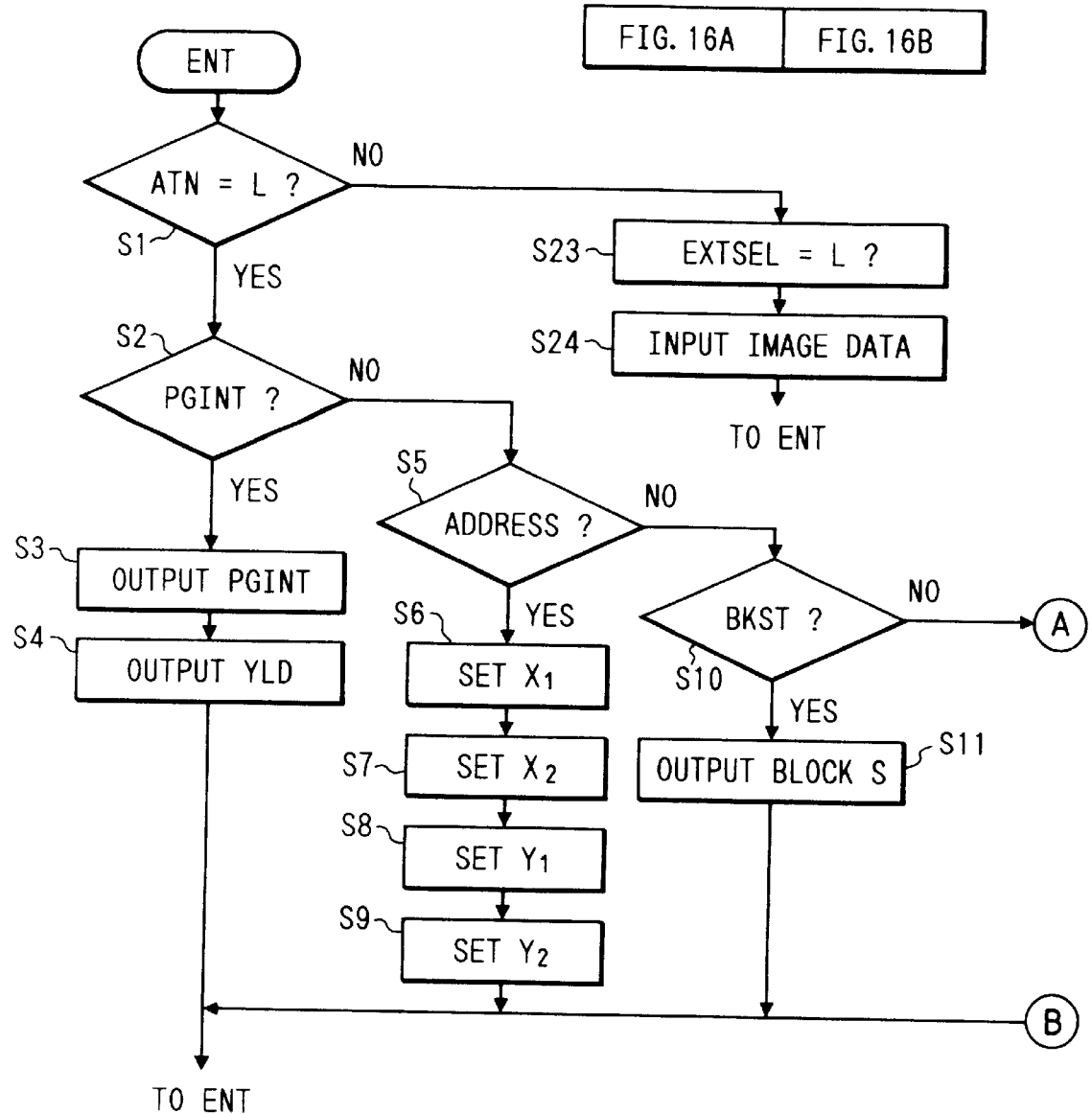

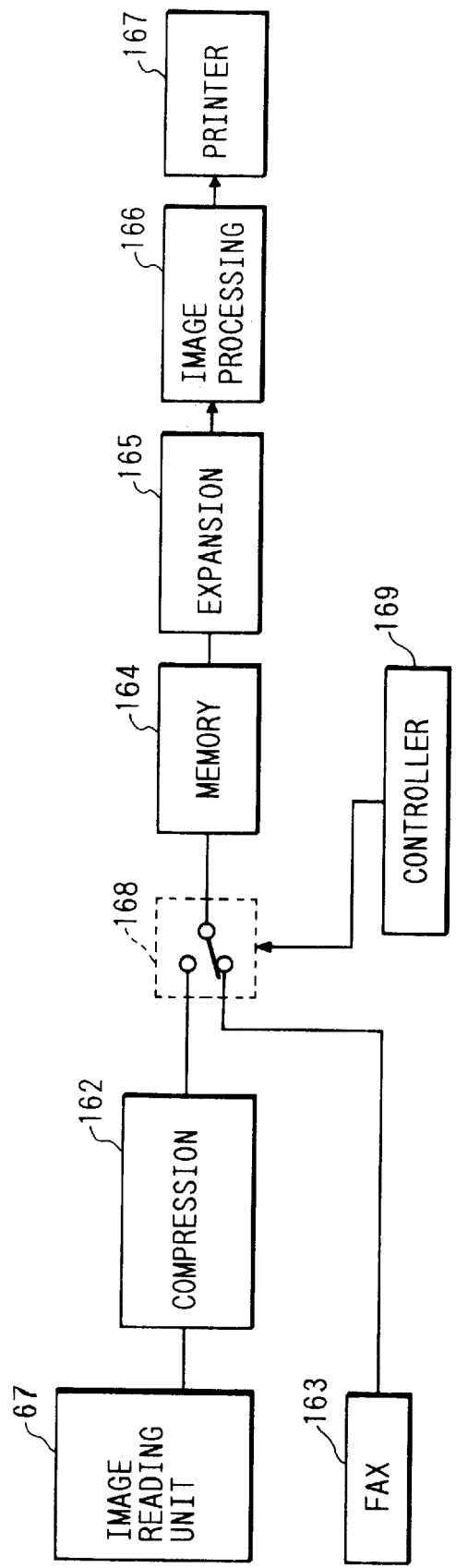

COLOR IMAGE PROCESSING APPARATUS CAPABLE OF HANDLING IMAGES READ LOCALLY AND IMAGES RECEIVED FROM AN EXTERNAL APPARATUS

This application is a continuation of application Ser. No. 07/691,968 filed Apr. 26, 1991 now abandoned.

BACKGROUND OF THE INVENTION

1. Field of the Invention

The present invention relates to an image processing system having an external unit interface function.

2. Related Background Art

In recent years, the spread of color copying apparatuses and the progress of the development thereof have been remarkable. There are many kinds of printer engines such as ink jet method, thermal copy transfer method, silver salt photographing method, electrophotographing method, and the like which can be used to realize the color copying apparatuses. Among them, the spread of the electrophotographing method is also remarkable because it has advantages such as high speed and high picture quality. FIG. 6 shows an example of a conventional color copying apparatus.

According to the above color copying apparatus, a color original is color-separated for every pixel and is digitally read as an electric signal and a full color print image is obtained by a color laser beam printer unit in accordance with the electrophotographing method. In the diagram, reference character A denotes an image reading unit and B indicates an image printer unit. In the image reading unit A, a color original 1 is illuminated by an original exposing lamp 2. A color reflection light image which has been reflected by the color original is formed on a color image sensor 3. The color image signal which has been color-separated by the color image sensor for every pixel is processed by a color signal processing circuit 4. The processed signal is supplied to an image processing circuit 5 through a cable 25. The image processing circuit 5 performs color correction by executing a digitalizing process on the input signal and a digital image process on chrominance signals and, thereafter, sends a digital image signal to the image printer unit B. A semiconductor laser 8 is modulated by a semiconductor laser drive unit 7 in accordance with the image data which has been transmitted to the printer unit via a cable 6 and a color-separated monochromatic latent image is formed like a raster image on a photo-sensitive drum. The latent image formed on the drum is developed by a developing apparatus 21, so that a color-separated toner image is formed on the photo-sensitive drum. On the other hand, copy paper is taken out of a paper cassette 17 (or 18) sheet by sheet and is fed to and wound around a copy transfer drum 12. Toner is copy transferred onto the copy paper synchronously with the foregoing color-separated toner image. As will be obviously understood from the diagram, only an image of one color is formed by a single image forming step as described above. Therefore, the color-separating step of the original is repeated a number of times which is equal to the number of toner colors, that is, four times corresponding to Y (yellow), M (magenta), C (cyan), and K (black). Similarly, the steps of formation of the latent image→development→copy transfer corresponding to the color component are also repeated synchronously with the respective color separating steps. In a state in which the copy paper is wound around the copy transfer drum 12, the drum is rotated four times thereby to complete the copy transferring steps of four colors. After that, the copy paper is peeled off by a separating claw 13 and is fed to thermal pressure fixing rollers 15 and 16, by which the toner image on the copy paper is fixed. The paper is then discharged out of the apparatus. In this manner, a full color copy of one sheet is finished. That is, in the case of the above kind of color copying apparatus, the above processing steps must be repeated for every color separation image, i.e., once each for Y, M, C, and K. Thus, the above method is not suitable to realize a further increase in speed.

In view of the above points, there has also been proposed an apparatus to realize higher speed by mutually overlappingly executing the foregoing processing steps of Y, M, C, and K by having a memory to store a color image signal and four drums, respectively for Y, M, C, and K.

On the other hand, in an apparatus as shown in FIG. 2, there has also been proposed an apparatus which can execute various processes by supplying image data from an external unit through an interface circuit by using characteristics such that an image is digitally handled.

However, a technique is not yet realized with respect to a point that the foregoing interface circuit is efficiently preferably provided or is provided by a simple construction in the apparatus having a plurality of drums and an image memory as mentioned above.

In not only the apparatus having a plurality of drums as mentioned above but also an apparatus having a color image memory, particularly, a memory to store the compressed color image data, it is a large subject how to construct the interface.

On the other hand, in U.S. Pat. No. 4,931,815 (U.K. Patent No. 2,190,265) assigned to the assignee of the present case, an image processing system having an external interface in an apparatus having a plurality of drums has been disclosed. Such a processing system still also has a point to be improved as a processing system generally.

SUMMARY OF THE INVENTION

In consideration of the above points, it is an object of the invention to provide a color image processing system having a novel interface.

Another object of the invention is to provide a novel interface for a color image processing system.

Still another object of the invention is to provide an interface which has image forming units of a plurality of colors and uses image encoding units for delaying image data among the image forming units of a plurality of colors.

To accomplish the above objects, according to a preferred embodiment of the invention, there is disclosed an image processing system comprising: means for generating a color image signal indicative of a target image; color compressing means for color-compressing the color image signal; memory means for storing the compressed color image data; means for expanding the image data stored in the memory means and for supplying the expanded data to the color image forming means; and an external interface for supplying the color image signal to the color compressing means separately from the generating means.

Still another object of the invention is to provide a color image processing system which can preferably synthesize color image data from an outside and image data from an image reading unit.

Yet another object of the invention is to provide a novel interface for the above synthesization.

The above and other objects and features of the present invention will become apparent from the following detailed description of the preferred embodiments taken with reference to the accompanying drawings.

BRIEF DESCRIPTION OF THE DRAWINGS

FIGS. 11A and 11B are timing charts showing operation timings of the circuit shown in FIG. 10;

FIG. 12 is a diagram showing the details of a data reading circuit;

FIGS. 17, 18, and 19 are diagrams for explaining other embodiments of the invention.

DETAILED DESCRIPTION OF THE PREFERRED EMBODIMENTS

The preferred embodiments of the invention will be described hereinbelow with reference to the drawings.

A construction of an apparatus to which the invention is applied will be first explained.

Figure 2:
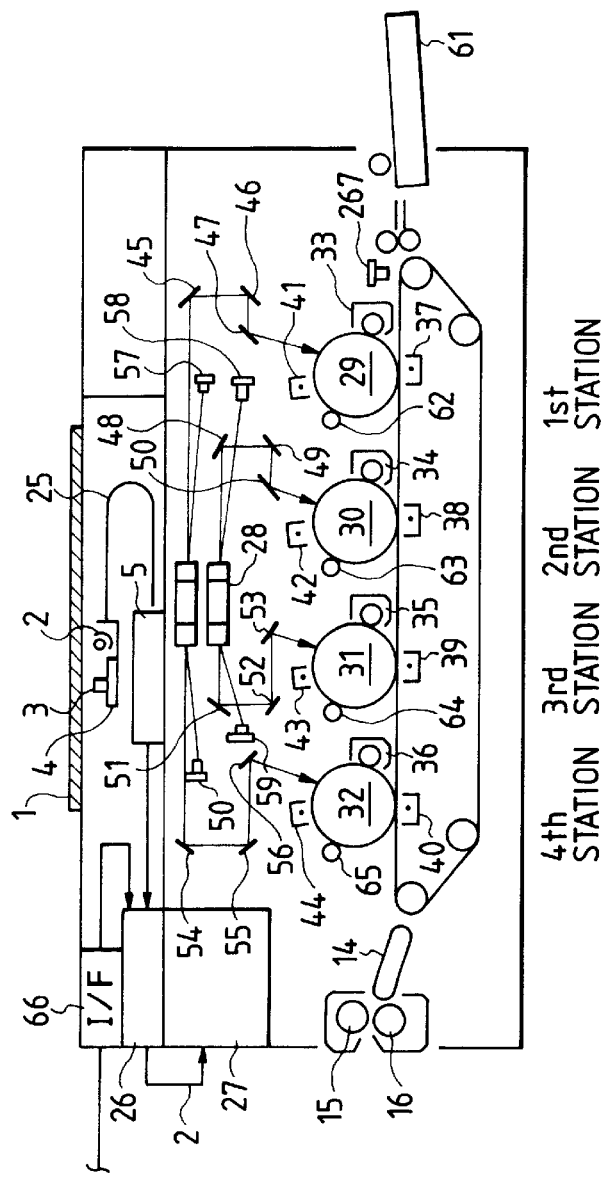
FIG. 2 is a diagram showing a cross-sectional view of an apparatus of an embodiment of the invention.

FIG. 2 is a cross-sectional view showing a construction of the above apparatus.

Figure 6:
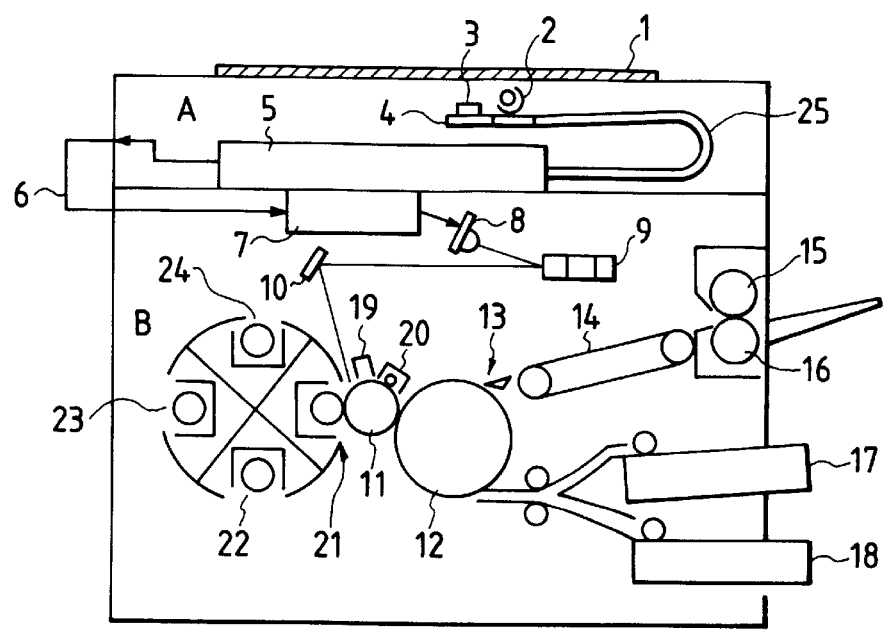
FIG. 6 is a cross-sectional view showing a construction of a conventional color copying apparatus.

The construction will now be briefly explained with reference to the drawings. (The parts and components having the same functions as those shown in FIG. 6 are designated by the same reference numerals.) An original 1 set on an original base plate is illuminated by the illuminating lamp 2. A color-separated image is read by the CCD color sensor 3 and is transmitted through the color signal processing circuit 4 and cable 25. The digital image processing is executed by the image processing circuit 5. The above processes are similar to those in FIG. 6. However, in the apparatus of this embodiment, a full color image signal of an amount of one page is temporarily stored in a memory device 26 after that processing. That is, as will be explained hereinafter, in such an apparatus, a plurality of photosensitive drums (image forming units) are arranged in parallel and images of a plurality of colors are formed at the same time. Therefore, it is necessary to store at least image data of an amount corresponding to only the distance between the adjacent image forming units. On the other hand, the image forming units independently have photosensitive drums (29 to 32), primary charging devices (41 to 44), developing devices (33 to 36), copy transfer charging devices (37 to 40), and cleaners (62 to 65) for the color components of M (magenta), C (cyan), Y (yellow), and K (black), respectively. The image signals of the respective color components which have already been stored in the memory device 26 are read out by a timing control circuit (not shown) at proper timings synchronously with a front edge signal of a paper which is detected by a paper front edge detector 267 in association with the progress of the paper which has been taken out and fed from a paper cassette. The image signals are processed by a second digital image processing unit 27. After that, the M (magenta) image is formed as follows. A light beam emitted from a semiconductor laser 57 and modulated by the image is reflected by a polygonal mirror 28 and reflecting mirrors 45, 46, and 47, and is irradiated onto the photo sensitive drum 29. Thus, a latent image thereof is formed on the drum. After that, a toner of the magenta color is applied by the developing device 33, so that the magenta image of the first color is formed on the copy paper by the copy transfer charging device 37. Subsequently, images of C (cyan), Y (yellow), and K (black) are similarly accurately developed and are copy-transferred by the second, third, and fourth stations. After that, the images of the respective colors formed on the copy paper are fixed by the fixing rollers 15 and 16 and the copying operations for one paper are completed.

Figure 3:
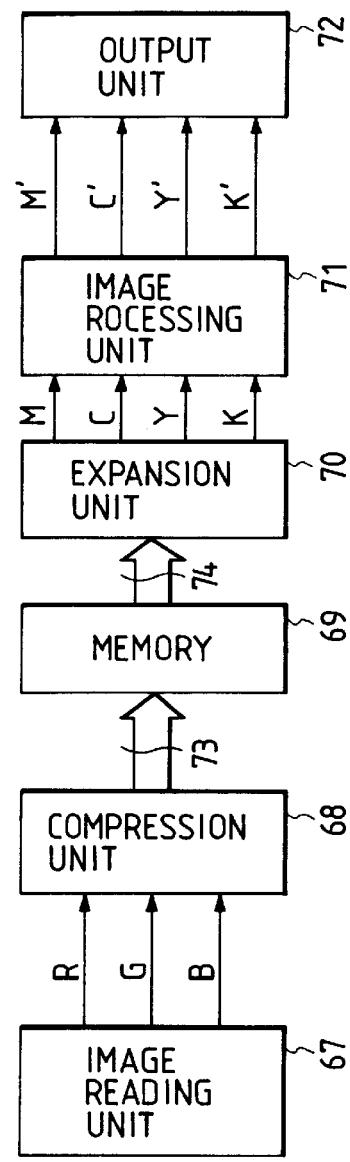
FIG. 3 is a block diagram showing an electric circuit construction of the apparatus of FIG. 2.

Since the copying apparatus has the construction in which a plurality of image forming units are arranged in parallel as mentioned above, a memory of a large capacity is needed to complete the full color copying operations of one copy paper. Therefore, as shown in FIG. 3, the images which have been read are compressed thereby to reduce the data amount. After that, the images are stored into a memory. The stored image data is read out of the memory synchronously with the operation of a printer unit, is expanded (demodulated) and is generated. Now, assuming that a full color image of the A3 size is given at a pixel density of 400 dpi, the data amount is equal to about 96 Mbytes. However, if such image data is compressed at a compression ratio of $\frac{1}{20}$ by a method such as a DCT or the like, it is sufficient to use a memory of the capacity of 4.8 Mbytes. Thus, a circuit scale and costs can be remarkably reduced.

FIG. 3 shows a block diagram in the case where color component signals of R (red), G (green), and B (blue) which have been read by an image reading unit 67 are compressed by a compression unit 68 and codes 73 are formed and stored in a memory 69 of a small capacity and, after that, the code data from the memory 69 is converted into the color components M, C, Y, and K by an expansion unit 70 and the converted color components are image-processed by an image processing unit 71 so as to have formats which are optimum to output, thereby obtaining signals M', C', Y', and K' and thereby obtaining a print image by an output unit 72.

Figure 4:
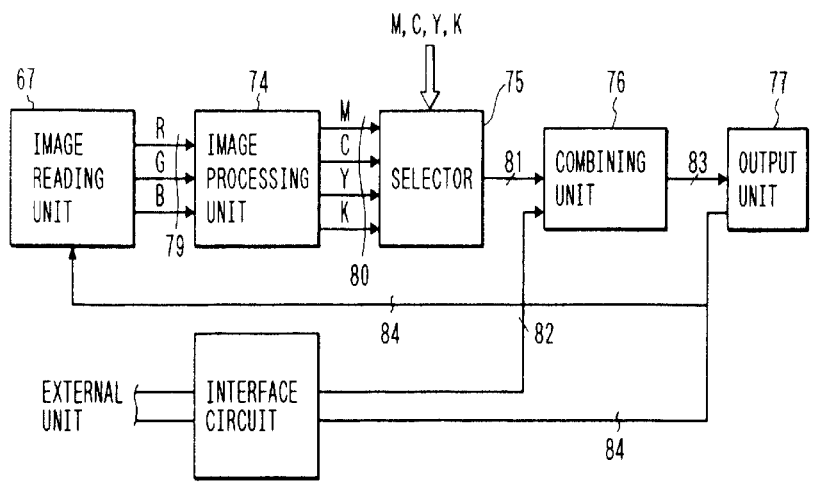
FIG. 4 is a diagram showing a construction of an interface which is used in an apparatus shown in FIG. 6.

FIG. 4 shows a construction in the case of combining an image with an image which is supplied from an external unit as an example for comparison with the foregoing embodiment. Such a construction is applied to the copying apparatus of the construction shown in FIG. 6. Signals 80 of M, C, Y, and K are formed by an image processing unit 74 on the basis of image signals 79 of R, G, and B which have been read by an image reading unit 73. Synchronously with the printing operation of an output unit, one of the M, C, Y, and K signals is selected by a selector 75. That is, the M signal is selected when the M (magenta) image is generated, the C signal is selected when the C (cyan) image is generated, the Y signal is selected when the Y (yellow) image is generated, and the K signal is selected when the K (black) image is generated. The selected color signal is combined by a combining unit 76, so that an image is formed including every color component. At this time, in the image reading operation as well, since images are supplied from an interface by the same sync signal line 84, all of the images are combined while keeping the desired positional relation. (The sync signal line 84 includes all signal lines which are necessary for synchronization).

Figure 5:
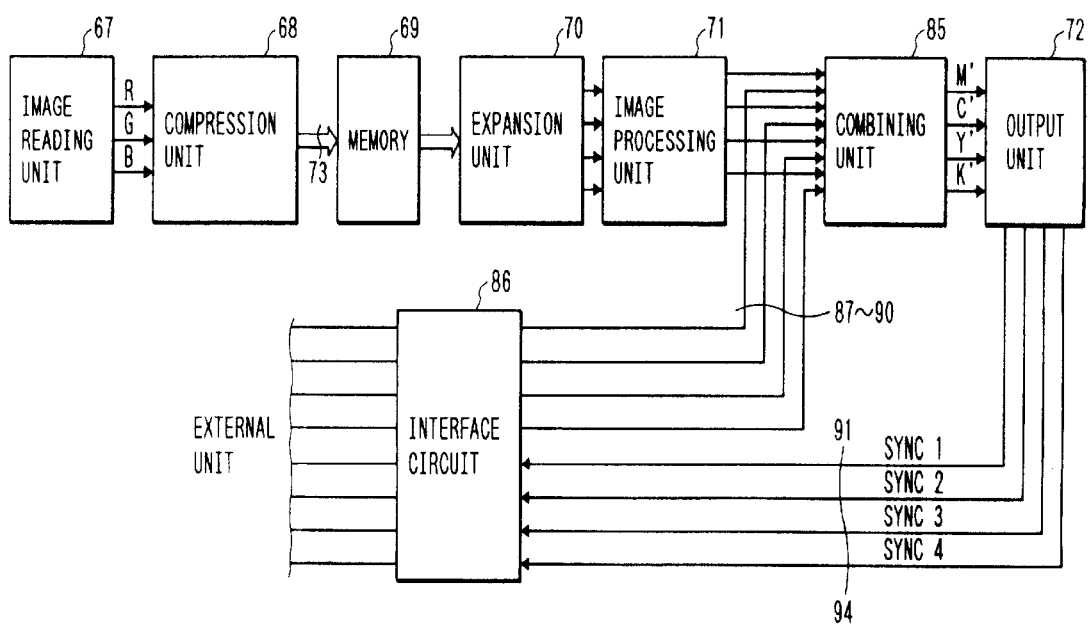
FIG. 5 is a diagram showing a construction in the case where an external interface is provided in the construction of FIG. 3.

FIG. 5 shows a diagram in the case of applying an external interface function to the copying apparatus having the construction of FIG. 2. The construction from the image reading unit 67 to the image processing unit 71 is the same as that in FIG. 3. By using such a construction, a color image signal can be supplied from the outside to the printer as shown in FIG. 2 and images can be also further combined. As will be obviously understood from the diagram, four kinds of image signals and four kinds of sync signals are necessary, so that not only does the interface circuit get larger, but also the number of transmission cables needed as signal lines increases, resulting in an increase in costs. Further, the timings to generate the images must be controlled on the external unit side. A special timing controller of high speed and large scale must be also provided on the external unit side. It is difficult to keep generality (i.e., to provide a design useful in all cases). On the other hand, since the number of high speed signal lines increases, radiation noise increases.

An embodiment of the invention which can also eliminate the above problems will now be described.

Figure 1:
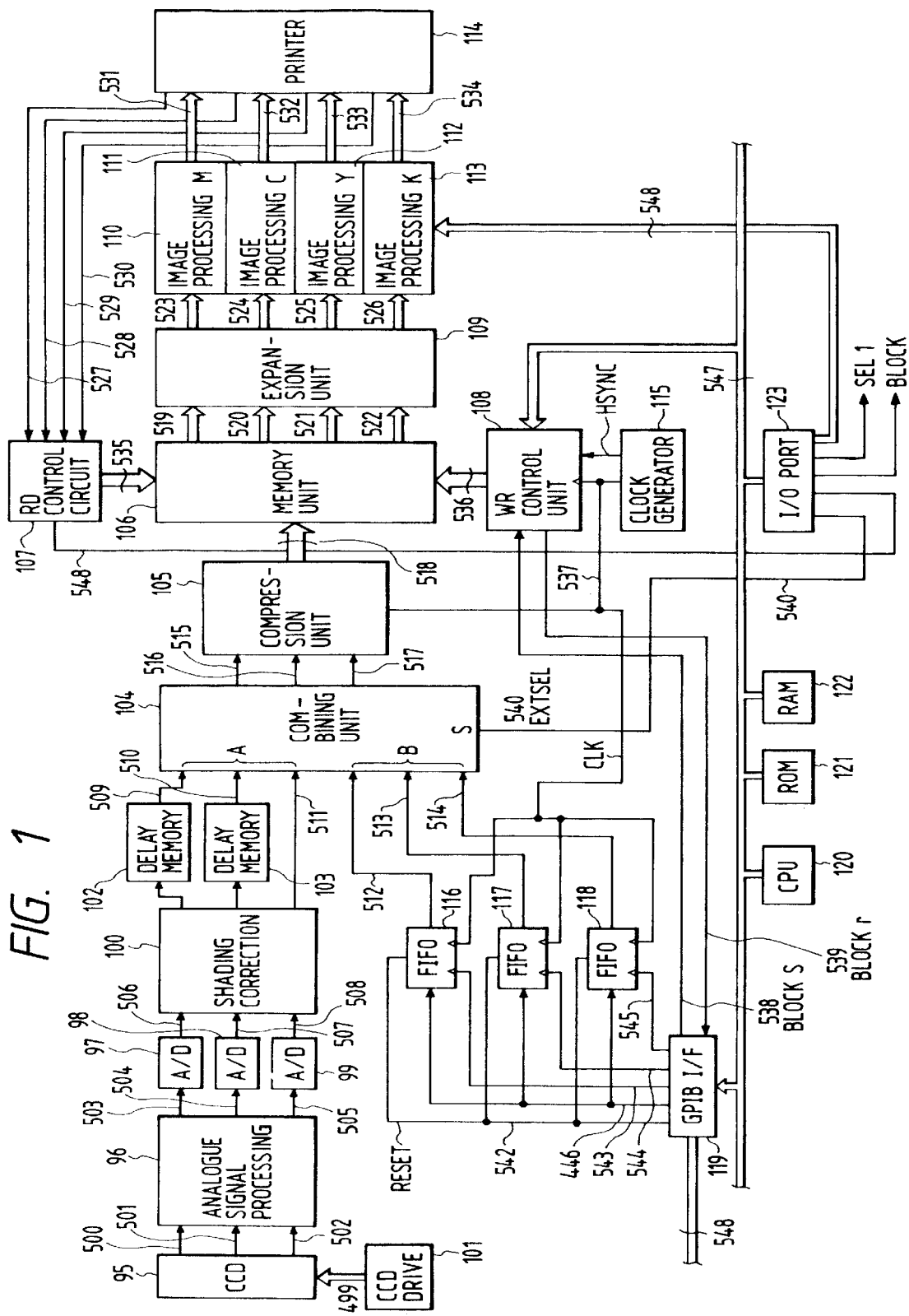
FIG. 1 is a block diagram showing a construction of an embodiment of the invention.

FIG. 1 is a diagram showing a whole system of the embodiment. Color separation signals 500, 501, and 502 of R, G, and B which have been read by a color CCD 95 which is driven by a CCD drive circuit 101 are supplied to an analog signal processing circuit 96, by which a black level and a white level are adjusted. After that, output signals from the processing circuit 96 are converted into the digital signals every color by A/D converters 97, 98, and 99, so that digital values 506, 507, and 508 are derived for every pixel. A well-known shading correction 100 is executed on the digital signals of the respective colors and, after that, the corrected signals are supplied to an image combining unit 104. Reference numerals 102 and 103 denote delay memories each for correcting a deviation of a spatial reading position every color of a color CCD (not shown). The combining unit 104 combines an original image which is obtained by detecting the reflected light from an original by the CCD 95 and an image which is supplied from the external unit, which will be explained hereinlater. In this embodiment, image data 509, 510, and 511 of R, G, and B corresponding to the original image and image data 512, 513, and 514 of R, G, and B which correspond to the image and are supplied from the external unit are switched on the basis of a selection signal 540. Output signals 515, 516, and 517 of the combining unit 104 are transferred to a compression unit 105, by which the data is compressed.

Figure 7:
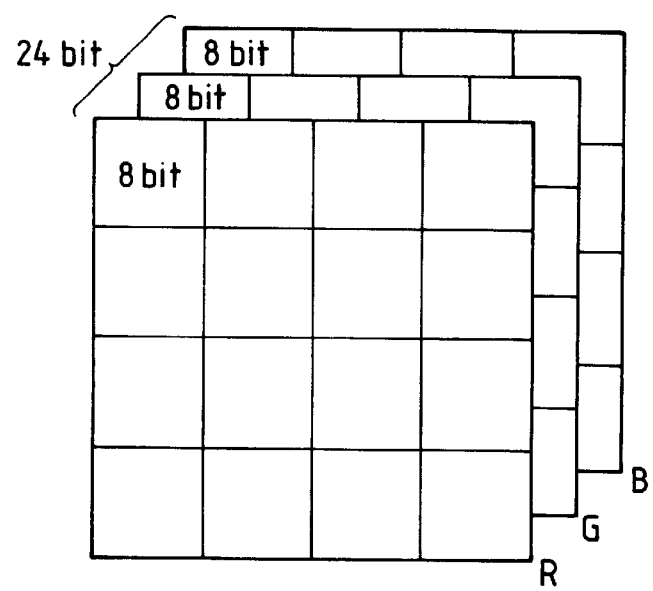
FIG. 7 is a diagram showing an example of a construction of color data.

As shown in FIG. 7, in the compression unit 105, the original image is divided into pixel blocks of 4×4 pixels. Now, assuming that each of the R, G, and B data is constructed by eight bits, the data amount of one pixel block is equal to 128 bits (=(4×4)×8 bits). Therefore, for three colors, a data amount of 384 bits (=128 bits×3) is compressed to a data amount of 24 bits at a compression ratio of 1/16. A compressing method such as vector quantization, orthogonal conversion quantization, or the like can be used for the compression circuit. A compressed and encoded code 518 is written into a memory unit 106 in accordance with addresses which are generated from a WR control circuit 108 as will be explained hereinbelow. The code 518 is read out of the memory unit 106 in accordance with RD addresses 535 which are generated from an RD control circuit 107. As already described in FIG. 2, it is necessary to read out data from the memory unit 106 in accordance with the proper positions on the four photo sensitive drums, that is, in accordance with the proper exposure timings. The above data reading operation is executed synchronously with sync signals 527 to 530 which are generated from a timing control circuit (not shown) for every color, namely, every exposing timing, to each photo-sensitive drum after the front edge of the copy paper was detected by the sensor 267 (FIG. 2). Codes 519 to 522 which have been read out for every photo sensitive drum at predetermined timings and have been encoded are respectively supplied to an expansion unit 109 and are expanded (decoded) for every color signal. At this time, an expanding method is determined in accordance with the compressing method used in the compression unit. The resultant expanded signals 523 to 526 are 24-bit signals of R, G, and B and are image processed in parallel in the respective photo-sensitive drums. For instance, in an image processing circuit 110, a color correcting process is executed so as to produce a signal M 531 corresponding to a development amount of a magenta (M) toner on the basis of the R, G, and B signals.

Figure 8:
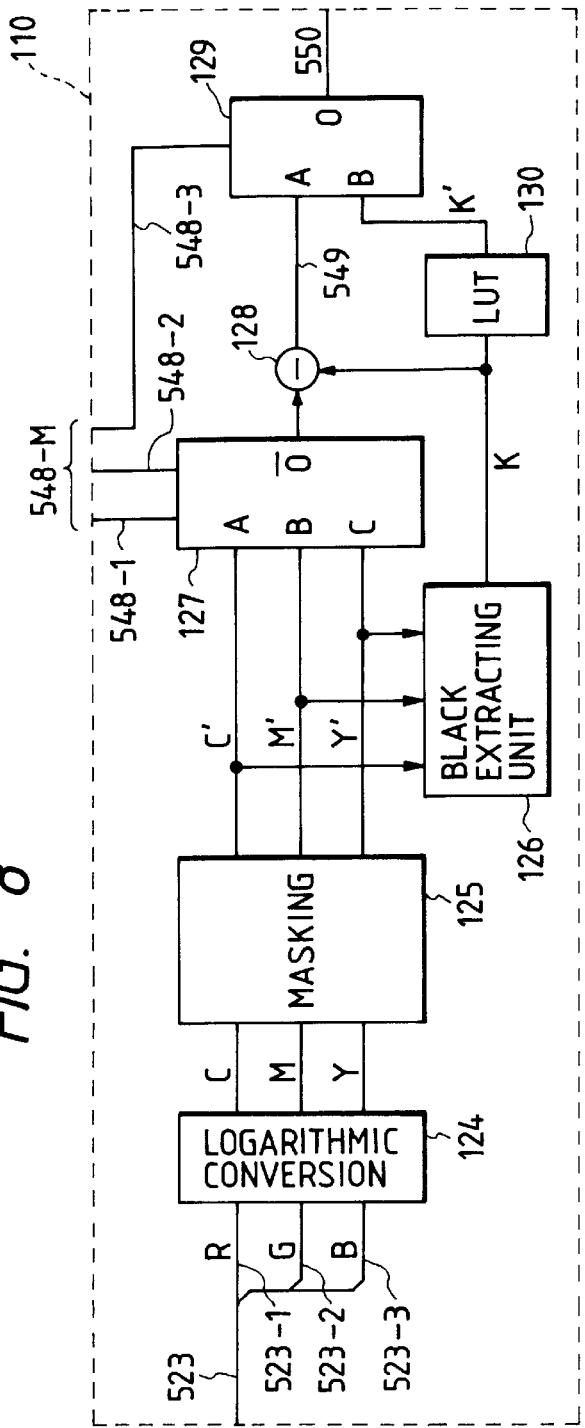
FIG. 8 is a diagram showing an example of a construction of an image processing block M 110.

FIG. 8 shows an internal block diagram of the image processing circuit M 110. Input signals 523-1, 523-2, and 523-3 of R, G, and B are subjected to a logarithmic conversion (124) and, after that, they are color corrected by well-known masking unit (125) and black extracting unit (126), so that the chrominance signals C', Y', M', and K are derived. Reference numeral 127 denotes a selector to select one of three input systems A, B, and C. Since the image processing block 110 is a block to produce a magenta image, switching signals 548-1 and 548-2 are generated from an I/O port in FIG. 1 so as to select the B input. Therefore, a selection signal 548-M is generated so as to select the A input in an image processing block C 111 and to select the C input in an image processing block Y 112. Reference numeral 128 denotes a subtracter to execute an undercolor removing process to control the color toners in accordance with the black component extracted in the black extracting unit 126. Reference numeral 549 denotes a corrected signal after completion of the masking process and the undercolor removing process. Reference numeral 129 denotes a selector to select between the black signal and the color signal. A selection signal 548-3 is generated from an I/O port 123 in FIG. 6 in a manner such that the A input is selected in the image processing circuits M 110, C 111, and Y 112 as a selector output 550 and that the B input is selected in an image processing circuit K 113. The black signal K which has been extracted from the C', Y', and M' signals is subjected to a proper gradation correction by an LUT 130 and, after that, the corrected black signal is generated as a signal K'.

On the other hand, in FIG. 1, image data is supplied from the external unit via an external input cable 548. In the embodiment, a transmission control is executed by a GPIB interface circuit 119. The image data supplied through the interface circuit 119 is transferred to FiFo memories 116, 117, and 118 through a signal line 446 and the data corresponding to one line of R, G, and B is stored, respectively.

In the embodiment, when the image data of (4×4) pixels is compressed by the compression unit 105, it is sufficient to construct the FIFO memories so as to store image data of at least four lines.

Figure 9:
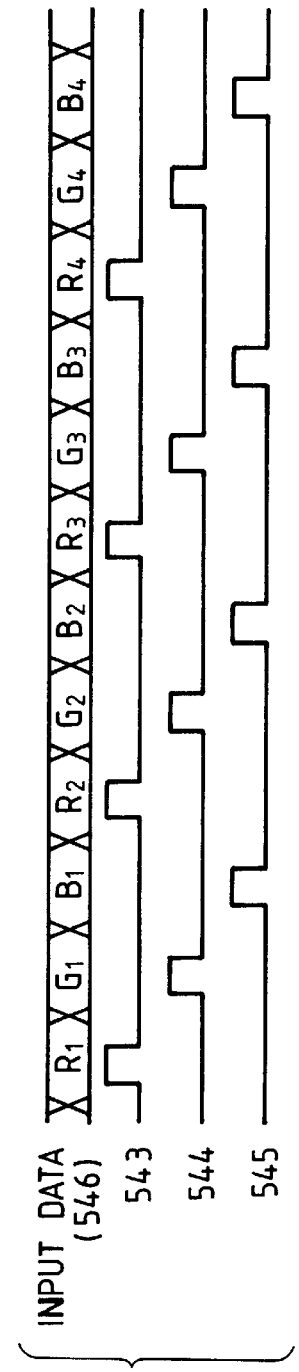
FIG. 9 is a timing chart showing a construction of data 546 which is supplied from a GPIB I/F 119 and timings of signals 543 to 545.

As shown in the timing chart of FIG. 9, color component data $R_1$, $G_1$, $B_1$, $R_2$, $G_2$, $B_2$, . . . are continuously input on the GPIB cable, for instance, for every pixel. FIFO memory WR clocks 543, 544, and 545 corresponding to a speed specified by the GPIB interface are generated for every color from the GPIB interface circuit. Therefore, the data of R, G, and B are stored into the FIFO memories 116, 117, and 118 for every line or every predetermined number of lines such as four lines, respectively. To store the image data which is supplied from the external unit into the memory unit 106, it is necessary to control in a manner such that the selection signal 540 which is supplied to the combining unit 104 is generated from the I/O port 123 so as to select the input image data 512, 513, and 514 and output signals of the FiFo memories 116 to 118 are transmitted to the compression unit 105. After the signals of one line or a predetermined number of lines such as four lines of R, G, and B from the external unit are stored in the FIFO memories 116, 117, and 118, a CPU 120 obtains an end signal of one line or a predetermined number of lines such as four lines from the external unit (not shown) through the GPIB interface circuit 119 and transmits a signal BLOCK S 538 to the WR control circuit through the GPIB interface circuit 119 (EOI which will be explained hereinlater). That is, the signal BLOCK S 538 indicates possibilities regarding the signal fetching of the R, G, and B data of one line into the FIFO memories 116 to 118 from the external unit through the GPIB interface circuit and the data writing into the memory unit. Due to this, the WR control circuit 108 generates predetermined write addresses into the memory unit, thereby starting the data writing operation.

Figure 10:
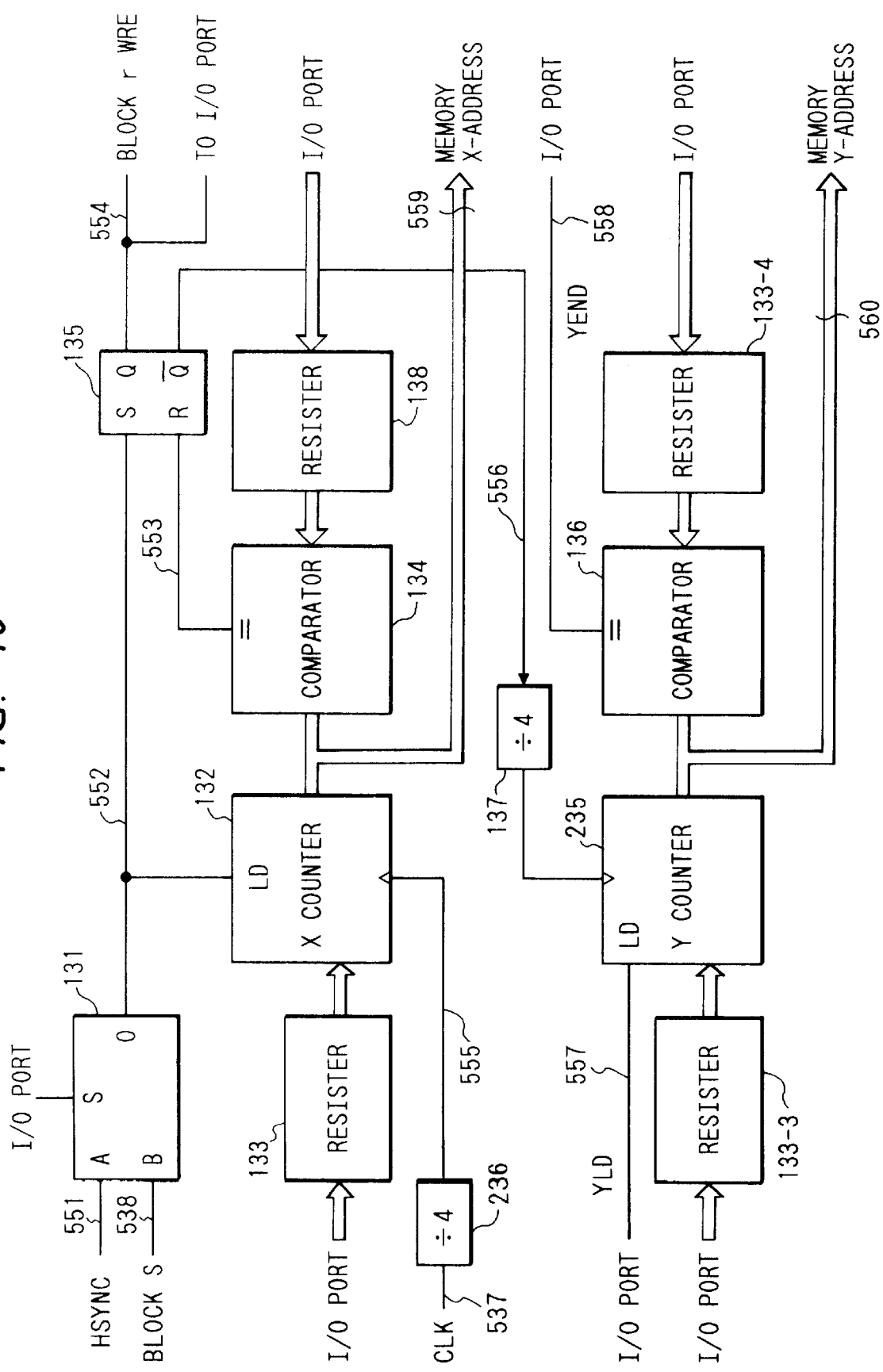
FIG. 10 is a block diagram showing a construction of a WR control circuit 108.

FIG. 10 is a diagram showing in detail the WR control circuit 108. Reference numeral 132 denotes an X address counter to generate an address in the X direction in the memory unit. Reference numeral 235 denotes a Y address counter to generate addresses in the Y direction. The X and Y address counters start the counting operations by the CPU from values which have been set in registers 133-1 and 133-3. Likewise, the address counters count up by the CPU unit values which have been set in registers 133-2 and 133-4. The address generating operation to write data of one line or one page is finished. A selector 131 outputs a signal to preset a value which has once been set in the register 133-1 per one period of the X address counter 132 and this signal is generated as a selection signal from the I/O port in a manner such that a sync signal HSYNC 551 in the main scan direction is selected when the image from the original base plate is written into the memory unit and that the signal BLOCK S 538 which is sent before the data of one line or a predetermined number of lines is transferred, is selected when the image data which is supplied from the external unit is written into the memory unit. For instance, assuming that the signal BLOCK S 538 has been selected by the selector 131, a selected signal BLOCK S 552 initializes the X address counter 132 and, further, sets an S-R flip-flop 135, thereby starting to write data of one line into the memory unit. The operation of the Y address counter is also similar to the operation of the X address counter except that the Y address counter is initialized by a YLD signal 557 which is sent from the I/O port prior to the copying operation and that a clock of the counter is a signal which is obtained by frequency dividing a signal BLOCK r 554 indicative of the data of one scanning operation in the main scan direction into ¼. When the value (=Y address 560) of the Y address counter coincides with the value set in the register 133-4, a YEND signal 558 is generated from a comparator 136 and is input through the I/O port 123 (shown in FIG. 1), thereby finishing the writing of the data of one page.

Figure 11C:
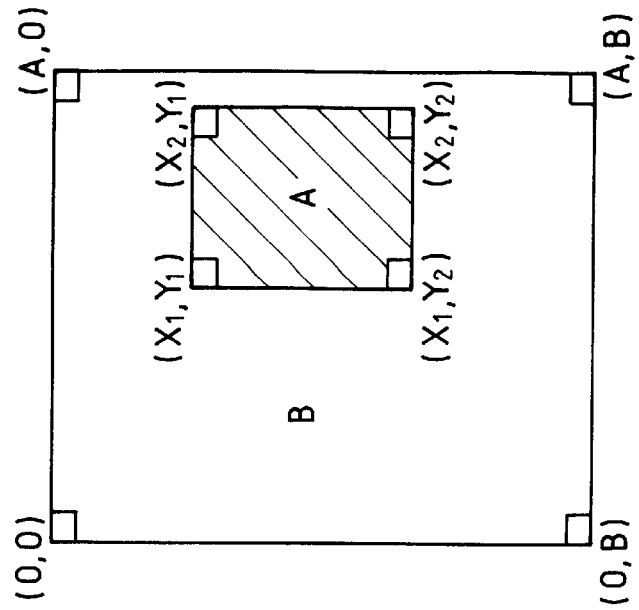
Fig. 11C is a diagram showing image areas according to the timing charts of FIGS. 11A and 11B.

FIGS. 11A and 11B are timing charts showing the operation of the WR control circuit. In FIG. 11A, when the signal BLOCK S 538 is supplied to the WR control circuit from the GPIB interface circuit 119 in FIG. 1, the S-R flip-flop 135 in FIG. 10 is set, the signal BLOCK r 554 is set to the high level, and after that, the X address counter generates addresses $A_0$, $A_1$, $A_2$, . . . , $A_{4N}$ each time four clock signals CLK 537 are input. The addresses are sent to the memory unit. On the other hand, since the data which is read out of the FIFO memories 116 to 118 (FIG. 1) is generated synchronously with the clock signals CLK 537, the addresses $A_0$, $A_1$, . . . respectively correspond to (d , $d_1$, $d_2$, $d_3$), ($d_4$, $d_5$, $d_6$, $d_7$), . . . , ($d_{4N}$, $d_{4N+1}$, $d_{4N+2}$, $d_{4N+3}$) of the data 512, 513, and 514. Further, the compression method whereby one code is produced on a block unit basis of (4×4) pixels is used as mentioned above. Therefore, codes $D_0$, $D_1$, $D_2$, . . . are generated one by one for every four clocks and are written into the memory unit. When the last data $D_{4N}$ in the main scan direction is stored into the address $A_{4N}$, a coincidence output signal 553 is generated from a comparator 134 in FIG. 10 and resets the S-R flip-flop 135 which has been set, thereby setting the signal BLOCK r 554 to the low level. After the same operation as that mentioned above is repeated four times, corresponding to four lines, the count value of the Y address counter is increased by +1. For instance, in Fig. 11B, $Y_1 \rightarrow Y_1+1$. After that, the Y counter counts up until $Y_2$ is reached. After completion of a series of operations at the Y address value=$Y_2$, the YEND signal 558 is set to the high level and the writing of the data of one page is finished. The above explanation relates to an example in the case of writing data into a special area A in the memory unit as shown in Fig. 11C and shows the case where four corners of the writing area are set to coordinates of $(X_1, Y_1)$, $(X_2, Y_1)$, $(X_1, Y_2)$, and $(X_2, Y_2)$ as addresses. Values $X_1$, $X_2$, $Y_1$, $Y_2$ are sequentially set into the registers 133-1 to 133-4 in accordance with this order. To store the image data in the memory unit 106 after the image which had been read out from the original base plate has bent compressed, the sync signal HSYNC 551 is selected by the selector 131 in FIG. 10 and U, A, U, and B are set into the registers 133-1 to 133-4. Thus, the image on the original base plate is stored into the whole area B by the operation similar to the operation described above. Although the image writing operation from the external unit into the A area has first been explained for convenience of explanation, no problem will occur even if the writing of the image of the B area, i.e., the image from the original base plate, is first executed.

As mentioned above, in this embodiment, after the image data supplied from the external unit is once written into the FIFO memories 116 to 118, clocks similar to those upon reading of the original are given from a clock generator 115 to the FIFO memories 116 to 118 and similar clocks are also given to the compression unit 105. Thus, the image data supplied from the outside is compressed at a high speed and, after that, the compressed data can be written into the memory unit 106. Therefore, there is no need to change the clocks and constructions of the memory unit 106 and compression unit 105 and there is a large practical effect when carrying out the invention.

On the other hand, in this embodiment, the capacity of each of the FIFO memories 116 to 118 has been set to a value corresponding to one line or a predetermined number of lines, such as four lines. However, in the case where a four-line buffer for compression is provided in the compression unit 105, the capacity of each of the FIFO memories 116 to 118 can be also set to a value of one line.

The reading operation of the image data written in the memory unit will now be described.

Figure 13:
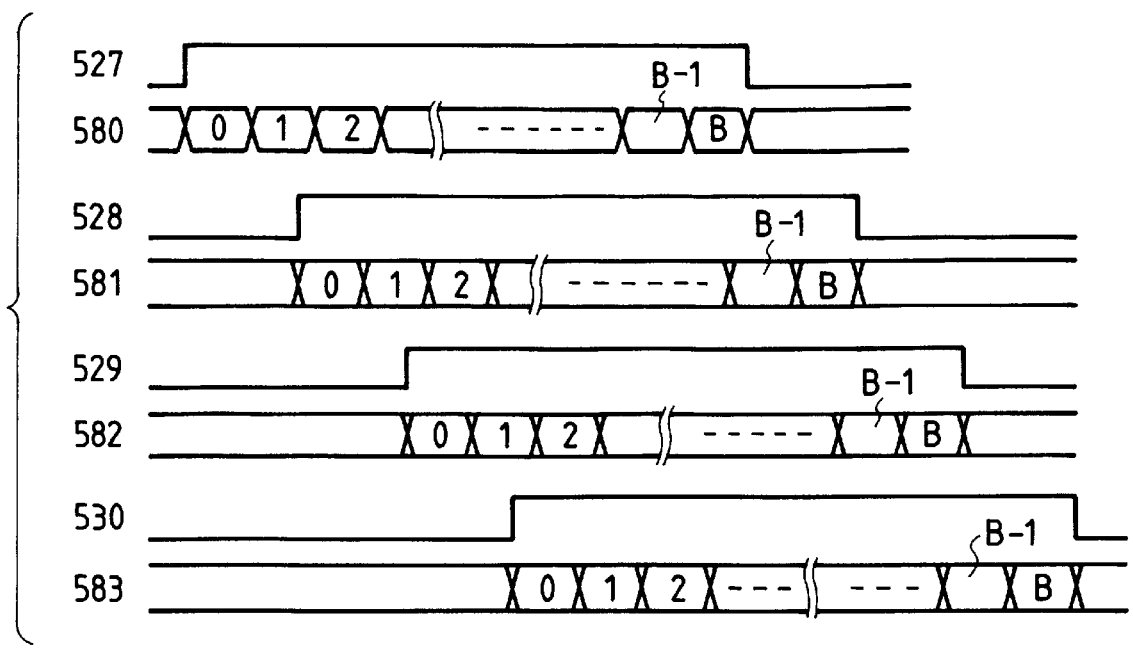
FIG. 13 is a timing chart for explaining the operation of the circuit shown in FIG. 12.
Figure 14:
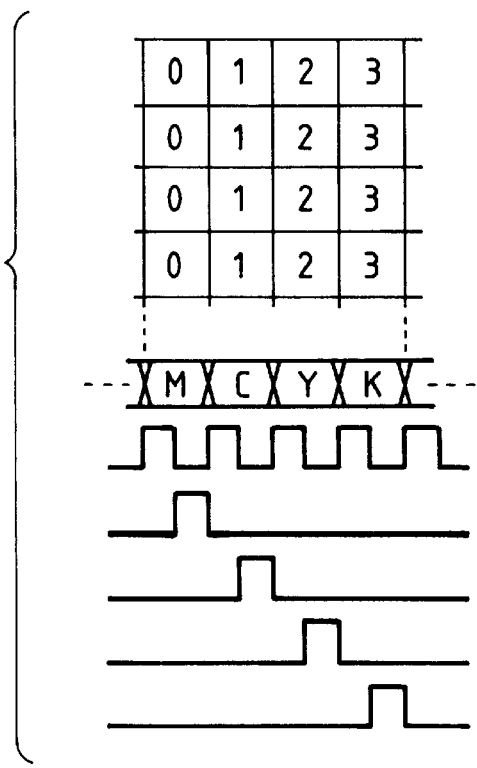
FIG. 14 is a diagram showing output timings of a pixel block of 4×4 pixels in a memory.

FIG. 12 shows a data reading circuit. As mentioned above, the reading operation of the image data from the memory unit needs to be performed synchronously with the exposing timing to the photo sensitive drum every color. For this purpose, when the image data is read out, the image data is transmitted drum every color (sync signals 527, 528, 529, 530) by a timing circuit in a printer (not shown) and is used as signals to start/stop the counting operations of read Y counters 142 to 145 of the respective colors. That is, as shown in the timing chart of FIG. 13, the address counting operation is stopped for an interval when the signals 527 to 530 are at the low level. The address generation is started for an interval when the signals 527 to 530 at the high level. When the signals 527 to 530 are sequentially generated, the RDY counters 1 (142) to 4 (145) sequentially start the counting operations and form addresses 580 to 583. On the other hand, an RDX counter 140 is commonly used for the respective colors. An X address is updated by a clock which is obtained by frequency dividing the clock signal CLK 537 by 4, thereby corresponding to the data expansion for every block of (4×4) pixels. In the pixel block of (4×4) pixels, the codes of 24 bits are assigned as codes in the memory. On the basis of the codes, the data is expanded (decoded) to 8-bit data for every pixel for each color component R, G, and B. In order to generate the data of four systems in parallel at different sub-scan timings in correspondence to the photo-sensitive drums of the respective colors, as shown in FIG. 14, the pixel block of (4×4) pixels is divided into the 0th column, 1st column, 2nd column, and 3rd column. In the zeroth column, the count value 580 of the RDY counter 1 (142) is supplied to the memory, in the first column, the output 581 (address for C) of the RDY counter 2 (143) is supplied, at the timing of the second column, the output 582 (address for Y) of the RDY counter 3 (144) is supplied, and at the timing of the third column, the output 583 (address for K) of the RDY counter 4 (145) is supplied. In this manner, those output signals are time-sharingly supplied to the memory unit. The codes which have been read out in correspondence to those outputs are latched into latches 249 to 252 at the respective timings.

Therefore, a selection signal of a selector 147 and latch clocks of the latches 249 to 252 are obtained from the lower two bits of the count value of the X address counter. For instance, when the lower two bits of the count value of the X address counter="0", this means the address indicative of the 0th column. At this time, in the selector 147, the X address 580 is given to the memory and the read-out data is the code data for M. Therefore, it is latched into the latch 249 and is used as data for M after that. In a manner similar to the above, when the lower two bits of the X address counter="1", the data is latched into the latch 250. In the case of "2", the data is latched into the latch 251. In the case of "3", the data is latched into the latch 252. The latched data is respectively supplied to the expansion unit 109 at the next stage as the code data for C, Y, and K.

Reference numeral 574 denotes a PHSYNC signal which is formed on the basis of a beam detection signal which is generated from a photosensor (not shown) arranged out of a photo-sensitive drum image area for detecting a beam reflected by the rotary mirror 28 in FIG. 2. As a signal 574, it is sufficient to select only one of four beams which are irradiated on the four photo-sensitive drums.

Figure 15:
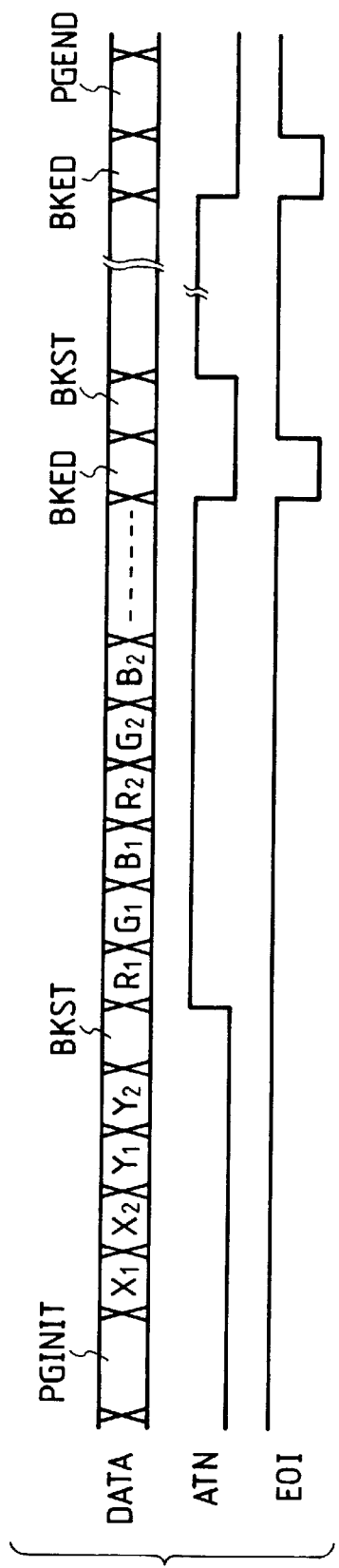
FIG. 15 is a diagram showing a protocol upon transmission and reception of image data with an external unit.

FIG. 15 shows an example of a protocol when image data is transmitted to and received from an external unit. Since the interface is based on, for instance, the GPIB specification, it is well known that the interface is executed by a DATA line, an ATN (attention), an EOI (end or identify), a handshake line (not shown), and the like. For an interval when ATN="L", the data on the DATA line is handled as a command. For an interval when ATN="H", the data on the DATA line is handled as image data. In this embodiment, EOI is sent from the external unit after completion of the transmission of the image data of one block, namely, one line. PGINT, PGEND, BKST, and BKED denote commands indicative of the start of transmission of the image data of one page, the end of transmission of the image data of one page, the start of transmission of the image data of one line, and the end of transmission of the image data of one line, respectively. $X_1$, $X_2$, $Y_1$, and $Y_2$ denote addresses (or position information) to write data into the memory unit. $R_1$, $G_1$, $B_1$, $R_2$, $G_2$, and $B_2$ denote R, G, and B components of the image data, respectively.

Figure 16B:
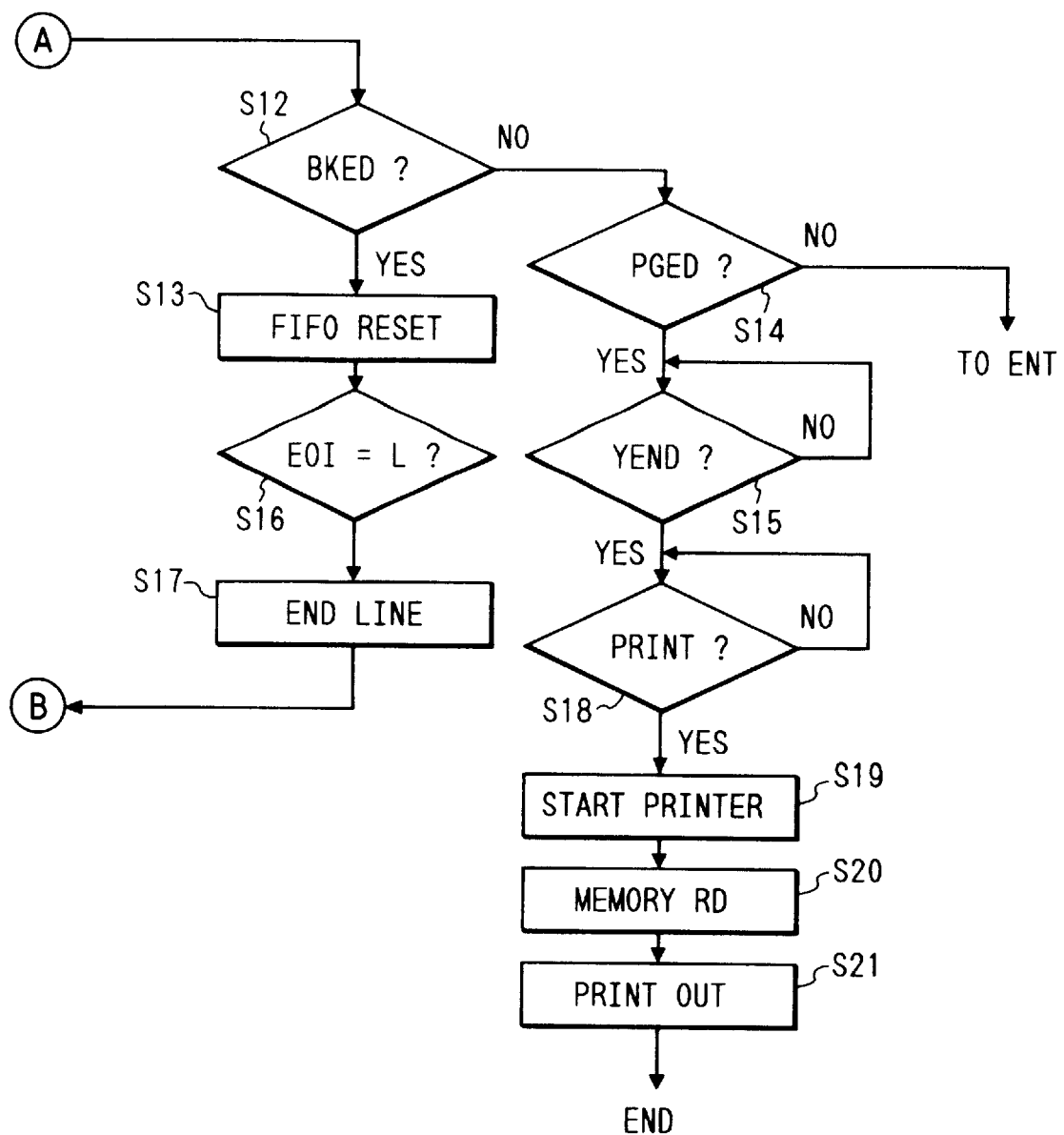
FIG. 16, consisting of FIGS. 16A and 16B, is a diagram showing an operating flow of a CPU 120.

FIG. 16, consisting of FIGS. 16A and 16B, is a flowchart for explaining the control of the CPU in which image data is supplied from an external unit and is written into the memory unit and is printed. In the processing flow which will be explained hereinbelow, it is assumed that the image data read out from the original base plate has already been written into the memory unit 106 by an amount of one picture plane. In step S1, a check is made to see if the input data is a command or data on the basis of the ATN on the GPIB. If it is the data (ATN="H"), a selection signal EXTSEL of the combining unit 104 is set to the low ("L") level (an A input is selected when EXTSEL="H"; a B input is selected when EXTSEL="L") in step S23. The inputting operation of the image data is repeated in step S24 (S1→S23→S24→S1→. . .). In the command mode (when ATN="L", steps S2, S5, S10, S12, S14), the content of the input command is interpreted and the operation corresponding to each command is executed. When the command indicates PGINT, a signal PGINT 590 and the signal YLD 557 are generated in steps S3 and S4 in order to initialize the Y address counters in the WR control circuit 108 and the RD control circuit 107. The apparatus waits for the input of the next command. When the command indicates addresses, the input addresses $X_1$, $X_2$, $Y_1$, and $Y_2$ (steps S6 to S7) are set into the registers 133-1 to 133-4 in the WR control circuit (FIG. 10) of the memory unit and the apparatus waits for the input of the next command. When the command indicates BKST (step S10) and BKED (step S12), they are the commands indicative of the start and end of the input of the data of one block (=one line). Therefore, the BLOCK S signal is sent in step S11 in the former case. A RESET signal for the FIFO memories is sent to initialize the FIFO memories at the input stage in the latter case. The apparatus waits for the reception of the next line. When the command is PGED in step S14, this means the end of reception of image data of one page. Therefore, a check is made in step S15 to see if the YEND signal of the WR control circuit has been set to the high level (refer to FIG. 11B) or not. If it has been set to the high level, step S18 follows and the printing operation is executed in steps S18 to S21. That is, after the data of one page is written into the memory unit, the printer is made operative and an image corresponding to the image data which has been read out of the memory unit is formed in response to a sync signal from the printer. In step S18, the printing operation is enabled in the case where a copy button (not shown) has already been depressed or the case where a "Print" command has been received from the external unit or the like. If the interface signal "EOI" on the GPIB is set to the low "L" level in step S16, this means the completion of the transfer of the image data of one line. Therefore, the apparatus waits for the reception of the next line.

[Second embodiment]

Figure 17:
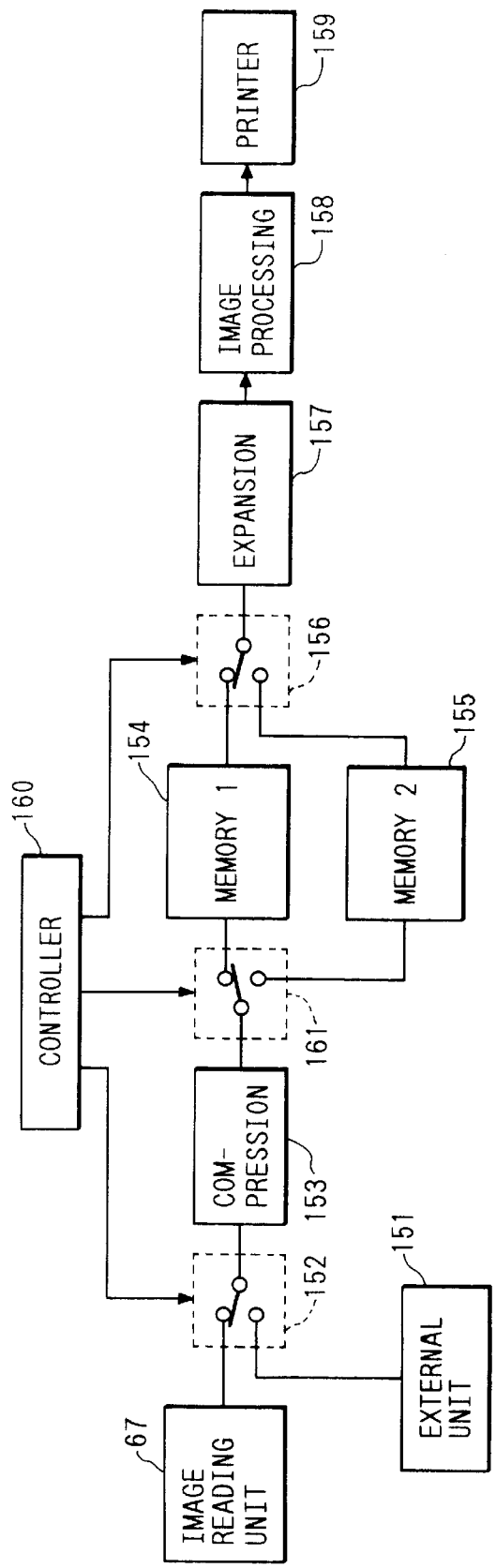

FIG. 17 shows the second embodiment of the invention. In the first embodiment, the memory unit has been used in common for the image on the original base plate and the image which is supplied from the external unit. However, in the second embodiment, memory planes are used independently. An image on the original base plate is read by an image reading unit 150 and is transmitted through a selector 152 which is controlled by a controller 160. The image data is then compressed by a compression unit 153. After that, the compressed data is transferred to a memory 1 (154) through a selector 161 which is similarly controlled by the controller 160. Then, the data is stored in the memory 1 (154). The image data supplied from an external unit 151 is transmitted through the selector 152 and the compression unit 153 and is supplied to a memory 2 (155) via the selector 161. After that, the stored image data is simultaneously read out of the memories 154 and 155 and a selector 156 is controlled so as to select the memory 1 (154) in the area to generate the image on the original base plate, for instance, areas A in FIG. 18 and to select the memory 2 (155) in area B. An expansion unit 157 and an image processing unit 158 are similar to the units which have already been described in detail above. A combined output is obtained by a printer 159 in a manner similar to the above.

[Third embodiment]

Figure 18:
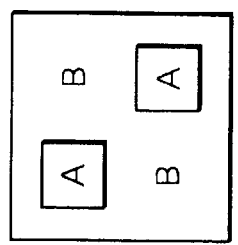

FIG. 19 shows the third embodiment according to the invention. The third embodiment relates to the case where the image data which has already been compressed is transmitted from an external unit and the other construction is similar to that mentioned in the second embodiment. The image data which has been read by an image reading unit 67 is compressed by a compression circuit 162 and is selected by a selector 168. After that, the compressed image data is stored in a memory 164. On the other hand, image data which is sent from an external unit has also already been compressed. Therefore, for instance, it is sufficient to consider that it is transmitted from a facsimile apparatus 163. The input image data is selected by the selector 168 and is combined and written into the memory 164. After that, the processes are executed in a manner similar to those in the first embodiment, so that a combined image as shown in FIG. 18 is similarly derived.

Although the first to third embodiments have been described with respect to the example in which images are combined, it is also possible to realize a combination of only the image on the original base plate, only the image from the external unit, plural images on the original base plate, or plural images from the external units by the above construction.

In the third embodiment shown in FIG. 19, even if a memory for an external unit is independently provided as shown in FIG. 17, a similar effect is obtained as described in the second embodiment.

As explained above, according to the preferred embodiments, when a full color copying apparatus (or printer) in which a plurality of drums are driven in parallel is connected to an external unit, the scale and costs of the interface can be remarkably reduced and an image combination can be realized by a simple control. Further, since the storing and combining operations of the image data are executed in a state of the combined image data irrespective of the kind of printer, the capacity of the memory to store the image data to be combined can be also fairly reduced. A plurality of copies can be also obtained by the single data transfer operation.

The invention is not limited to the apparatus as described above but can be also similarly applied to an apparatus having a function of compressing a color image signal, such as a color still image filing apparatus or the like.

As described above, according to the preferred embodiments, the external interface to supply color image data can be realized by an efficient construction and can be further simplified.

The present invention is not limited to the foregoing embodiments but many modifications and variations are possible within the spirit and scope of the appended claims of the invention.

What is claimed is:

1. A color image processing system comprising:
   means for generating a first color image data representing an image to be formed;
   compressing means for compressing the first color image data;
   memory means for storing compressed color image data compressed by said color compressing means;
   means for expanding the compressed image data stored in said memory means to produce expanded image data and for supplying the expanded image data to color image forming means;
   means for temporarily storing second image data from an external section according to a first clock signal; and
   means for reading out and supplying the second image data to said compressing means according to a second clock signal different from said first clock signal such that the second image data is synchronized with the compression process.

2. A system according to claim 1, wherein said generating means comprises means for generating the first color image signal by reading an original.

3. A system according to claim 1, wherein said compressing means comprises means for executing color compression by performing a block encoding process.

4. A system according to claim 1, wherein said memory means comprises means for storing image data of one picture plane.

5. A system according to claim 1, wherein said external interface comprises a GPIB interface.

6. A system according to claim 1, further comprising color image forming means having a plurality of color image forming units of different forming colors.

7. A color image processing apparatus comprising:
   input means for inputting first color image data representing an original image; and
   an external interface for supplying second color image data separate from the first color image data, the external interface being adapted to supply uncompressed second color image data;
   means for combining the first color image data from said input means and the second color image data from said external interface in response to a control signal to produce output color image data representing an output color image so as to form a single composite image;
   compressing means for compressing said output color image data;

a memory for storing the compressed output color image data in a memory area representing one image and from which the color image data can be supplied to a plurality of printer units for color recording; and means for reading out and expanding the compressed output color image data stored in said memory, and for supplying the color image data in parallel to a plurality of printer units.

8. An apparatus according to claim 7, wherein said first and second color image data is color image data.

9. An apparatus according to claim 7, wherein said memory stored color image data of one picture plane.

10. An apparatus according to claim 7, wherein said second color image data is supplied through a GPIB interface.

11. An apparatus according to claim 7, further comprising original reading means for generating image data to be stored into said memory means.

12. An apparatus according to claim 7, wherein said compression means for compressing compresses said output color image data by a block encoding process.

13. A color image processing method comprising:

an input step of inputting first color image data representing an original image; and, a supplying step of supplying from an external interface, second color image data separate from the first color image data, said external interface being adapted to supply uncompressed second color image data;

a combining step of combining the first color image data from said input step and the second color image data from said supplying step in response to a control signal to produce output color image data representing an output color image so as to form a single composite image;

a compressing step of compressing said output color image data;

a storing step of storing the compressed output color image data in a memory area of a memory representing one image and from which the color image data can be supplied to a plurality of printer units for color recording; and a reading step of reading out and expanding the compressed output color image data stored in said storing step, and for supplying the color image data in parallel to a plurality of printer units.

14. A method according to claim 13, wherein the first color image signal indicative of the target image is generated by reading an original.

15. A method according to claim 13, wherein said compressing step is executed by a block encoding process.

16. A method according to claim 13, wherein, in said storing step, image data of one picture plane is stored.

17. A method according to claim 13, wherein the second color image data is combined with the first color image data which is not compressed, on the basis of a control by a CPU, and wherein said compressing step compresses the combined color image data.

18. An apparatus according to claim 13, wherein said second color image data is supplied through a GPIB interface.

* * * * *

UNITED STATES PATENT AND TRADEMARK OFFICE
CERTIFICATE OF CORRECTION

PATENT NO. : 5,771,108

DATED : June 23, 1998

INVENTORS : YOSHINORI IKEDA ET AL.

Page 1 of 3

It is certified that error appears in the above-identified patent and that said Letters Patent is hereby corrected as shown below:

IN THE DRAWINGS

Sheet 6 of 14   In boxes 133, 133-3, 133-4 and 138 "RESISTER" should read --REGISTER--.

Column 2 line 28,   "large subject" should read --a significant problem as to--.

Column 4 line 25,   "photo sensitive" should read --photo-sensitive-;
   line 42,   "into" should read --in--;
   line 49,   "of the" should read --of a--; and
   line 50,   "a" should read --the--.

Column 5 line 57,   "hereinlater." should read --hereinbelow.--.

Column 6 line 15,   "photo sensitive" should read --photo-sensitive--;
   line 19,   "exposing" should read --exposure--;
   line 21,   "was" should read --is--; and

UNITED STATES PATENT AND TRADEMARK OFFICE
CERTIFICATE OF CORRECTION

PATENT NO. : 5,771,108

DATED : June 23, 1998

INVENTORS : YOSHINORI IKEDA ET AL.

It is certified that error appears in the above-identified patent and that said Letters Patent is hereby corrected as shown below:

Column 6 continued line 22,   "photo" should read --photo- --.

Column 7 line 3,    "FiFo" should read --FIFO--;
   line 16,   "lines" should read --lines,--;
   line 22,   "FiFo" should read --FIFO--; and
   line 32,   "hereinafter)." should read --hereinbelow).--.

Column 8 line 21,   "(d" should read --($d_o$,--;
   line 36,   "$Y_2$is" should read --$Y_2$ is--; and
   line 47,   "bent" should read --been--.

Column 9 line 14,   "photo sensitive" should read --photo-sensitive-- and "every" should read --for every--;
   line 16,   "drum every" should read --every--; and
   line 30,   "the" (second occurrence) should be deleted.

Column 10 line 4, "only" should read --any.

UNITED STATES PATENT AND TRADEMARK OFFICE
CERTIFICATE OF CORRECTION

PATENT NO. : 5,771,108
DATED : June 23, 1998
INVENTORS : YOSHINORI IKEDA ET AL.

It is certified that error appears in the above-identified patent and that said Letters Patent is hereby corrected as shown below:

Column 12 line 1, "an" should be deleted;
line 6, "fairly" should read --greatly--; and
line 49, "interface" should read --section--.

Column 13 line 12, "stored" should read --stores--;
line 24, and," should read --and--.

Column 14 line 27, "An apparatus" should read --A method--.

Signed and Sealed this

Sixteenth Day of November, 1999

Attest:

Q. TODD DICKINSON

Attesting Officer    Acting Commissioner of Patents and Trademarks